United States Patent [19]
Kawamura et al.

[11] Patent Number: 5,587,799
[45] Date of Patent: Dec. 24, 1996

[54] COPYING MACHINE WITH RESERVED COPYING AT A PREDETERMINED TIME PERIOD

[75] Inventors: Motomi Kawamura, Aichi-ken; Masamichi Kishi; Takeshi Morikawa, both of Toyokawa, all of Japan

[73] Assignee: Minolta Camera Kabushiki Kaisha, Osaka, Japan

[21] Appl. No.: 99,937

[22] Filed: Jul. 30, 1993

[30] Foreign Application Priority Data

Aug. 1, 1992 [JP] Japan ..................... 4-225089

[51] Int. Cl.$^6$ ............... H04N 1/00; H04N 1/21; G03G 21/00
[52] U.S. Cl. ............ 358/296; 358/401; 358/403; 358/404; 355/206; 355/204
[58] Field of Search ............ 355/200–209, 355/308, 313–314; 358/296, 401, 403, 404, 437, 444, 501, 504, 524; 345/203; 395/162, 164; 371/7

[56] References Cited

U.S. PATENT DOCUMENTS

| | | | |
|---|---|---|---|
| 4,497,568 | 2/1985 | Komiya et al. | 355/14 R |
| 4,615,609 | 10/1986 | Honma | 355/14 R |
| 4,708,461 | 11/1987 | Okuda et al. | 355/14 R |
| 4,821,107 | 4/1989 | Naito et al. | 358/256 |
| 5,040,019 | 8/1991 | Ito . | |
| 5,048,072 | 9/1991 | Yasuda | 379/53 |
| 5,084,770 | 1/1992 | Nakayama | 358/403 |
| 5,168,371 | 12/1992 | Takayanagi | 358/296 |
| 5,177,620 | 1/1993 | Fukushima . | |
| 5,392,131 | 2/1995 | Umeno | 358/493 |

Primary Examiner—Stuart N. Hecker
Assistant Examiner—K. Shin
Attorney, Agent, or Firm—Price, Gess & Ubell

[57] ABSTRACT

A copying machine having the ability to read and store an image of an original document in a memory means is provided. An operator can interrupt a copying process of the original document and enter an image of a subsequent document into the copying machine and have it reproduced at a subsequent time period which can be preset. The copying machine can reserve and reproduce the reserved image, even if there is an inadvertent activation of an off switch on the power supply.

27 Claims, 8 Drawing Sheets

(1)     1 ▨ : _ _

(2)     1 9 : ▨ _

(3)     1 9 : 3 ▨

(4)     1 9 : 3 0

| JOB No. | process complete flag | reserve time | copy mode data | address of image data |
|---|---|---|---|---|
| 1 | 1 | 03:00 | number of copies : 50<br>copy density : AUTO<br>number of documents : 2<br>copy paper : A4 | XXXXXX |
| ┆ | ┆ | ┆ | ┆ | ┆ |
| 5 | 0 | 00:30 | number of copies : 100<br>copy density : 3 t<br>number of documents : 1<br>copy paper : A3 | XXXYYY |

COPYING MACHINE WITH RESERVED COPYING AT A PREDETERMINED TIME PERIOD

BACKGROUND OF THE INVENTION

1. Field of the Invention

The present invention relates to a digital copying machine. More specifically, the present invention relates to a digital copying machine capable of accomplishing image formation on paper at an optional reserved time.

2. Description of the Related Art

Conventional copying machines present disadvantages inasmuch as when a certain operator has a large volume of copying to be done, this operator engages the sole use of said copying machine for a long period during which said copying machine is unavailable for use by other operators. One technique for eliminating the aforesaid disadvantage is a copying machine disclosed in U.S. Pat. No. 4,708,461. This copying machine provides an automatic document feeder(hereinafter referred to as "ADF") having a plurality of document trays on which can be placed reserved original documents (original documents to be copied at a reserved time range). At a predetermined reserved time, this copying machine automatically feeds reserved original documents from the document tray and transports said original documents onto a document glass platen, and executes a copying operation.

However, the aforesaid copying machine disclosed in the U.S. Patent has certain disadvantages inasmuch as the reserved original documents are left occupying the document tray until the reserved time range. These disadvantages are described below:

(1) Other operators may be unaware that the aforesaid original documents are reserved documents, and may possibly remove the reserved original documents from the document tray;

(2) an operator Cannot take measures to correct document feed trouble (e.g., original jam) in the ADF because original documents are fed when the operator is away from the area;

(3) the copying machine cannot be reserved by a plurality of operators (copying operations cannot be performed during optional reserved times).

Among the aforesaid three disadvantages, the third (3) disadvantage can be eliminated by providing a plurality of document trays. However, the provision of a plurality of document trays increases the cost of the copying machine. The embodiments of the copying machine disclosed in the aforesaid U.S. Patent are limited to two document trays due to restrictions in construction.

A further disadvantage unrelated to the previously described problems, is that the reserved copying cannot be accomplished when the main switch of the copying machine is turned off.

SUMMARY OF THE INVENTION

A first object of the present invention is to provide a superior copying machine capable of convenient operation.

A further object of the present invention is to provide a copying machine capable of reserved copying without sole use of document tray and which allows correction of document feed trouble.

A still further object of the present invention is to provide a copying machine capable of allowing a plurality of reserved copies without complicating the construction of the copying machine.

An even further object of the present invention is to provide a copying machine wherein reserved copying cannot be hindered by other operators.

The aforesaid objects of the present invention are accomplished by providing a copying machine comprising:
  image reading means for reading image of said original document and for generating image data corresponding to the image of said original document;
  memory means for storing said image data read by said image reading means;
  image forming means for forming image on a sheet based on said image data stored in said memory means;
  clocking means for clocking time;
  judging means for judging whether or not the time being clocked by said clocking means reaches a predetermined time; and
  controlling means for controlling said image forming means to start the image formation on a sheet based on said image data stored in said memory means when the time being clocked by said clocking means reaches the predetermined time.

BRIEF DESCRIPTION OF THE DRAWINGS

In the following description, like parts are designated by like reference numbers throughout the several drawings.

DETAILED DESCRIPTION OF THE PREFERRED EMBODIMENTS

The preferred embodiments of the present invention are described hereinafter with reference to the accompanying drawing and in the following sequence: (1) copy machine construction; (2) copy machine control; (3) power switch OFF countermeasures.

(1) Copy Machine Construction

Figure 1:
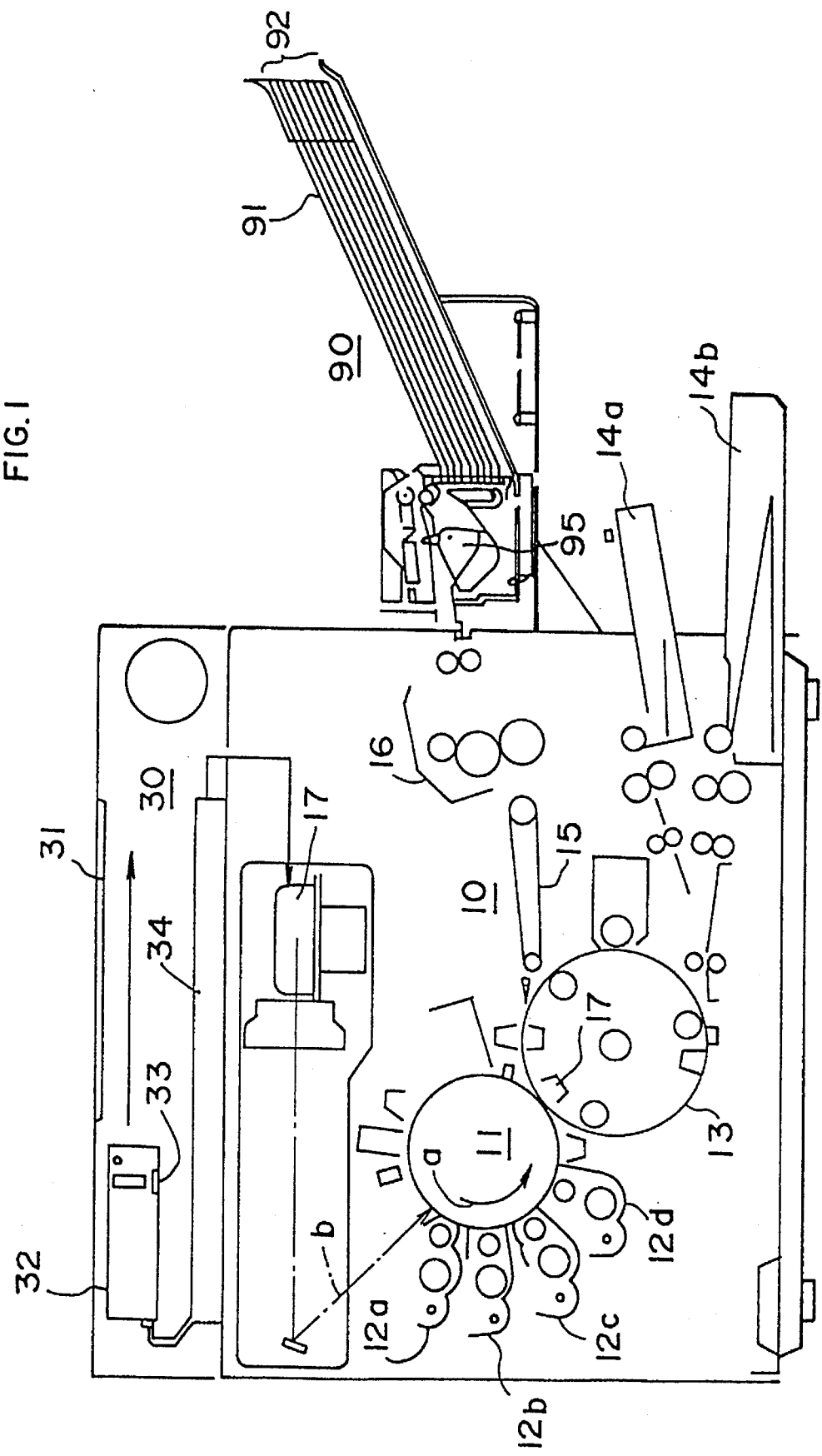
FIG. 1 is an elevation view in section briefly showing the construction of the copying machine of the present invention.
Figure 2:
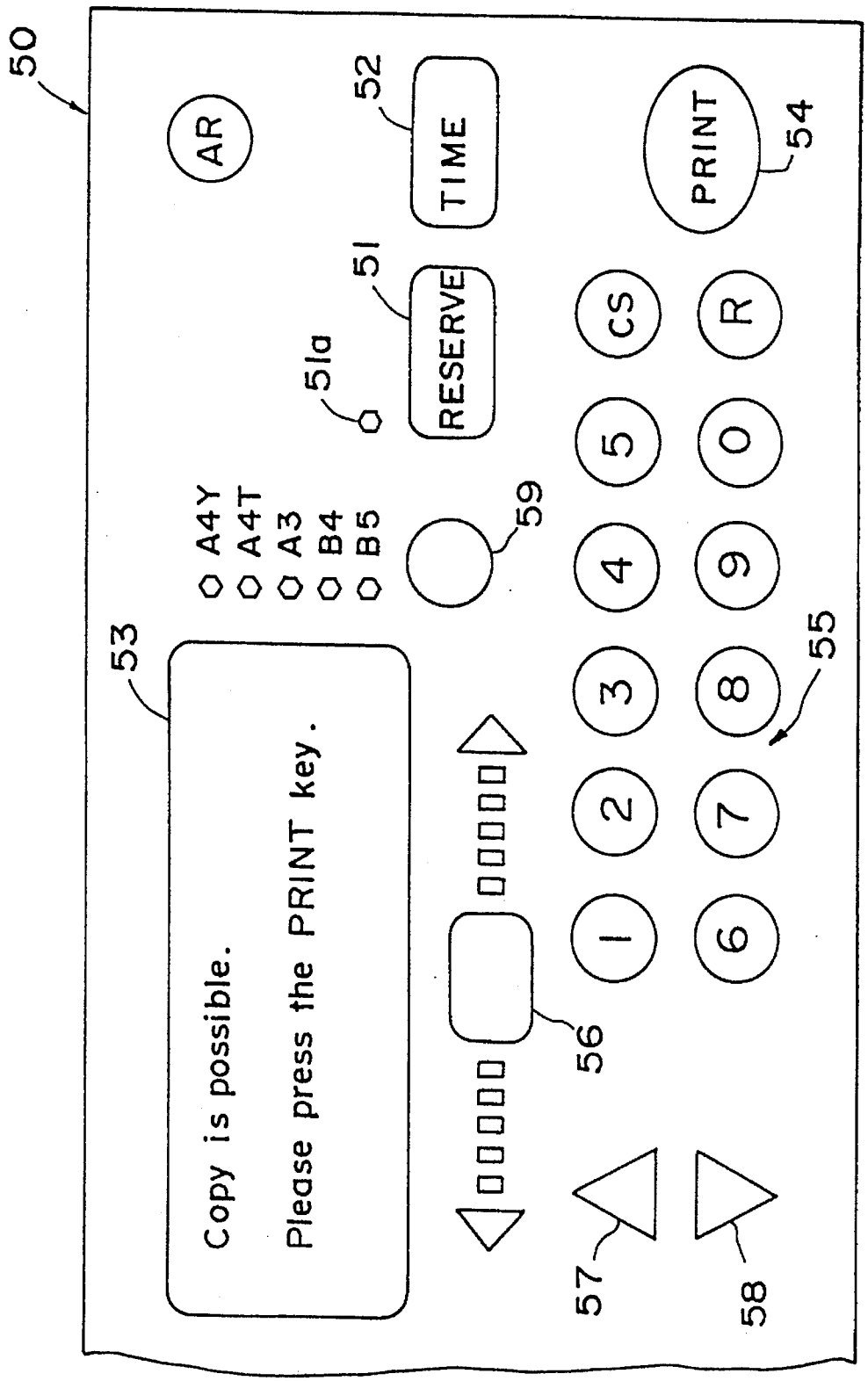
FIG. 2 is an illustration showing the operation panel of the copying machine of FIG. 1.

FIG. 1 is an elevation view in section briefly showing the construction of an embodiment of the copying machine. FIG. 2 shows the operation panel. This copying machine is a digital copying machine comprising an image reading section 30 for reading an original document image and generating image data, an image forming section 10 for reproducing a copy image on paper in accordance with said image data and the data specified via the operation panel, and a sorter 90 for sorting paper discharged from the copying machine after the copy image has been formed and accommodating said paper in bin 91. Details of the individual section are described below.

(1-1) Image Reading Section 30

In the image reading section 30, the original document image is read and image data is generated to modulate the output of the laser diode (not illustrated) of the image forming section 10. That is, the image surface of the original document is placed facedown on the document glass platen 31, and said image surface is scanned by a one-dimensional color image sensor 33 provided in the scanner 32 which moves at constant speed in the subscanning direction (arrow direction in the drawing) below the document glass platen 31. By means of the aforesaid scan, electric signals are individually generated corresponding to individual red/green/blue (R/G/B) densities of the original document. These electric signals are subjected to predetermined processing by the signal processing section 34 which converts them to image data that are then stored in the image data memory 75 (refer to FIG. 4). Thus, the time required for image reading by the copying machine of the present invention is relatively short.

(1-2) Image Forming Section 10

In the image forming section 10, an electrostatic latent image is formed on the surface of a photosensitive drum 11 via laser light modulated in accordance with image data read from the aforesaid image data memory 75 (write process). This write process is accomplished by high-speed scanning in the main scanning direction (axial direction of the photosensitive drum 11) wherein the aforesaid laser light irradiates the charged surface of the photosensitive drum 11 rotating at constant speed in the arrow a direction. This high-speed scan is realized by the aforesaid laser light impinging the surface of the photosensitive drum 11 after being reflected by a polygonal reflective mirror 17 which is rotated at high speed.

The, electrostatic latent image formed on the surface of the photosensitive drum 11 is developed using the suitable developing devices among the developing devices 12a through 12d which respectively accommodate toners of the colors yellow/magenta/cyan/black (Y/M/C/Bk), so as to produce a toner image (toner developing process).

The aforesaid toner image is transferred onto a paper disposed on the transfer drum 13 via a transfer charger 17 (transfer process). Furthermore, the paper disposed on the transfer drum 13 is paper fed from a desired cassette among the paper supply cassettes 14a or 14b, and which is previously suctioned tie the transfer drum 13 via a suction means not shown in the drawing.

The previously described write process, toner developing process, and transfer process are executed a total or, four times, i.e., once for each the individual colors yellow Y, magenta M, cyan, C, and black Bk in the full color mode, and are executed one time for the relative toner color in the monocolor mode, e.g., black and white mode.

When the final transfer process has been completed (the fourth transfer process in the full color mode), the paper is separated from the transfer drum 13, and transported to the fixing device 16 via a transport belt 15, and is subjected to a image fixing process via heat and pressure fusion. Thereafter, the paper is discharged form the copying machine. Thus, in the copying machine of the present invention, the image forming operation requires a longer time than does the image reading operation.

(1-3) Sorter 90

In the sorter 90, the paper discharged from the copying machine is sorted in accordance with the sorting mode, and is accommodated in one bin among the first bin 91 or second through tenth bins 92. The discharge of the paper from the copying machine is detected by a paper sensor 95.

The sorting modes may be of various types set for each job. There are three sorting modes described below.

(1) Non-sort mode for discharging paper to the same bin without sorting.

(2) Sort mode for discharging paper to separate bins for each set number of copies.

(3) Grouping mode for discharging copies of the same original document to the same bin.

These sorting modes are selected via key switches (not illustrated) provided on the operation panel 50 of FIG. 2.

(1-4) Operation Panel 50

The operation panel 50 is provided on the front side of the document glass platen 31 of the copying machine (operator side). Arranged on the operation panel 50 are a reserve mode key (reserve set key) 51 for setting and cancelling the reserve mode, reserve display LED 51a which can be lit to display the reserve mode set condition, time set key 52 for setting the reserved time input mode, display 53 for displaying the copying machine state and messages and the like, print key 54 for specifying the print operation, ten-key pad 55 for inputting numerical values 0–9, density set key 56 for regulating copy density, copy magnification keys 57 and 58 for setting copy magnification, paper selection key 59 for specifying the paper size and all reset key AR for resetting all of the modes which has been input from the keys of operation panel 50. The reserved mode is the mode for setting reserve copying.

(2) Copying Machine Control

Figures 3A, 3B:
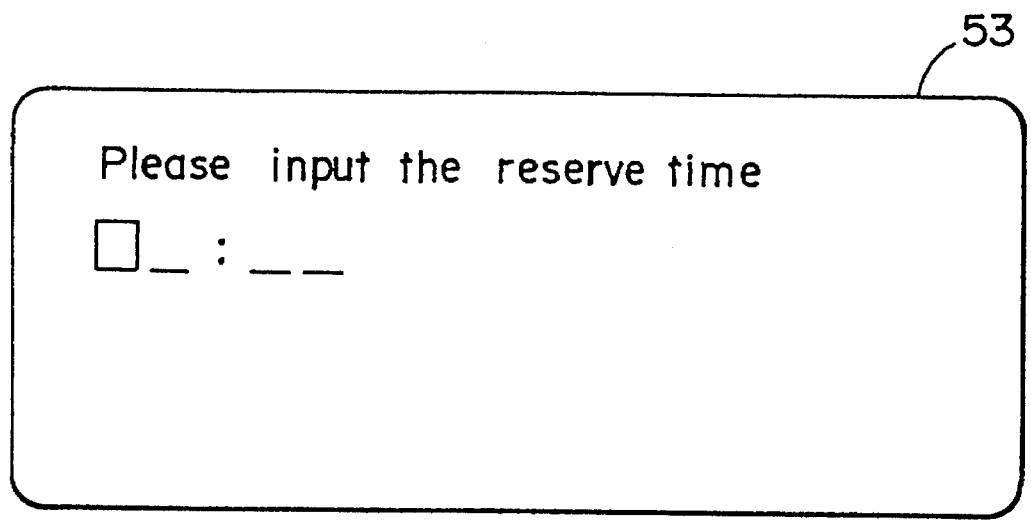
FIG. 3a is an illustration showing a sample display of the display portion of said operation panel in the time setting mode.
FIG. 3b is an illustration showing the time setting method in the time setting mode of the reserve mode.
Figure 4:
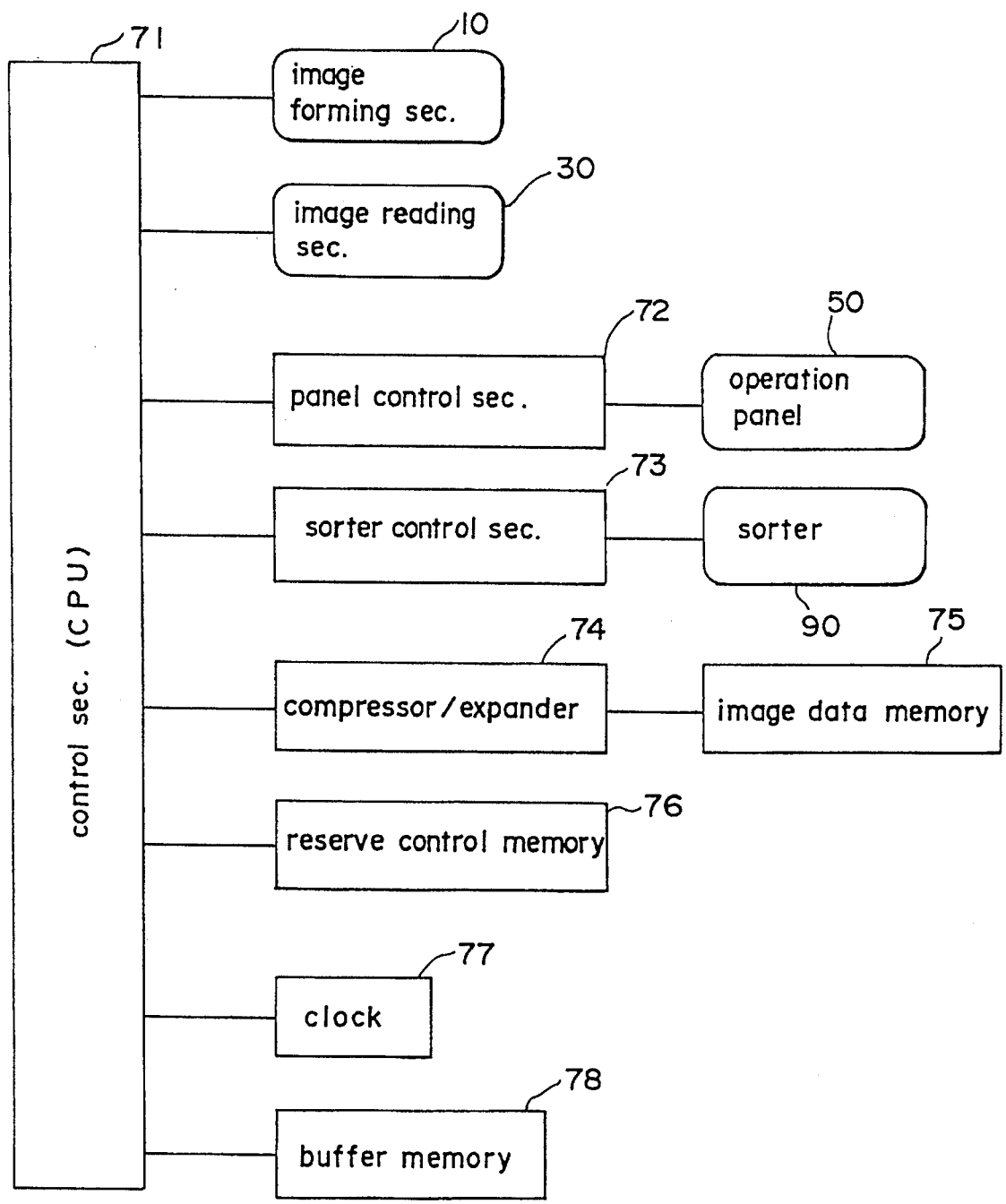
FIG. 4 is a block diagram showing the construction of the control circuit of the copying machine of FIG. 1.
Figure 5:
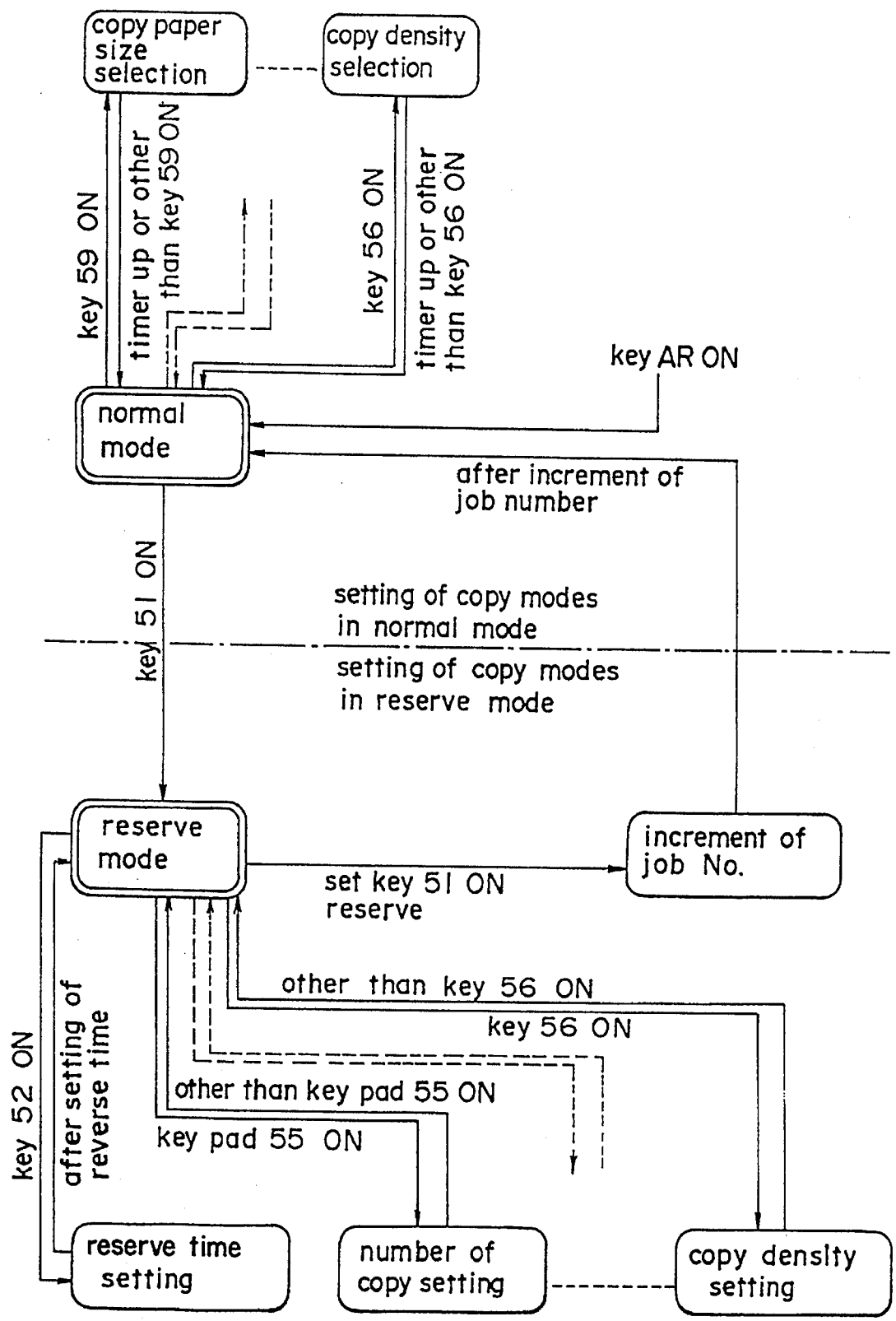
FIG. 5 is an illustration showing the copy mode setting method in the normal mode and the reserve mode of the copying machine of FIG. 1.
Figure 8:
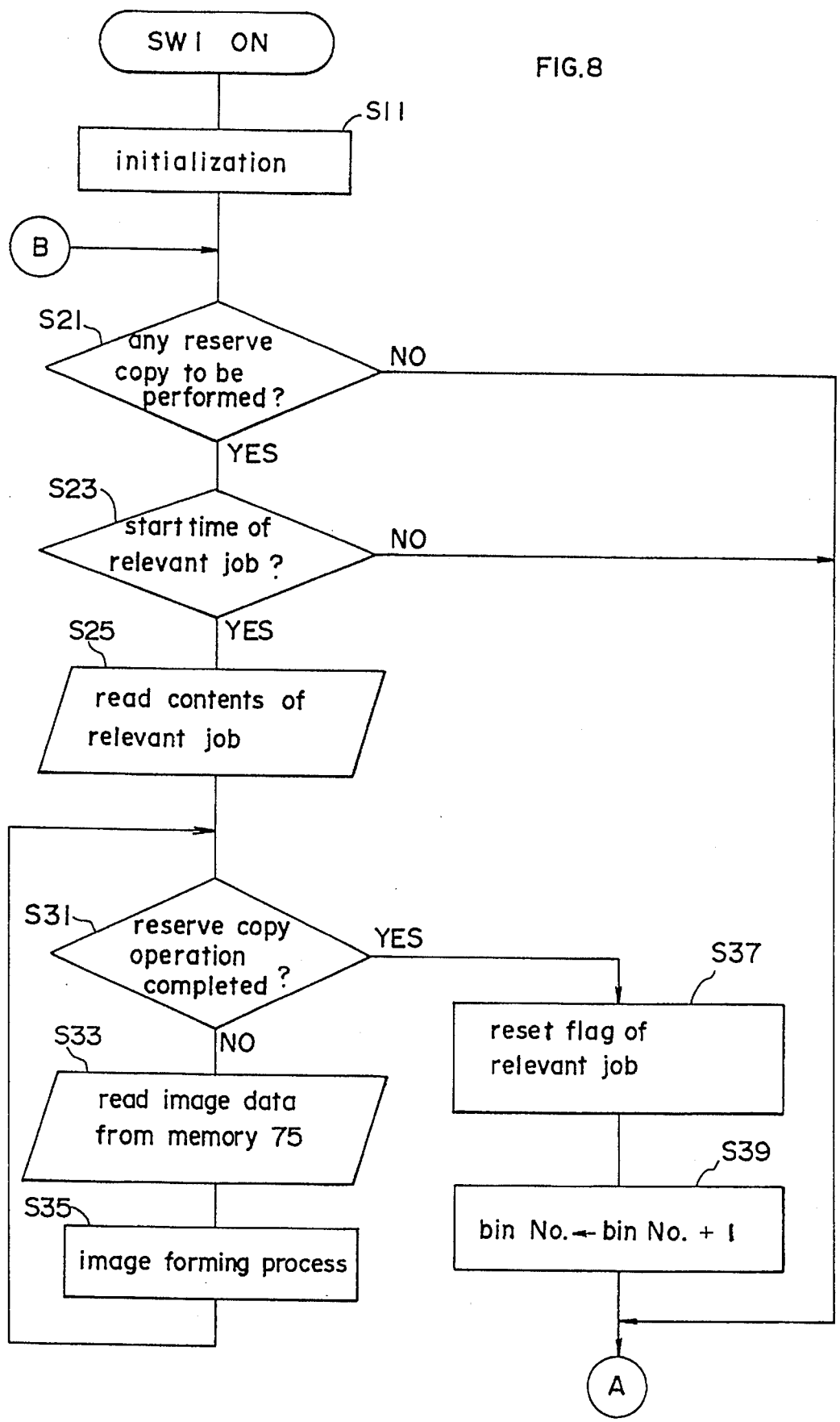
FIG. 8 is a partial flow chart showing the process of the control section 71 of FIG. 4.
Figure 9:
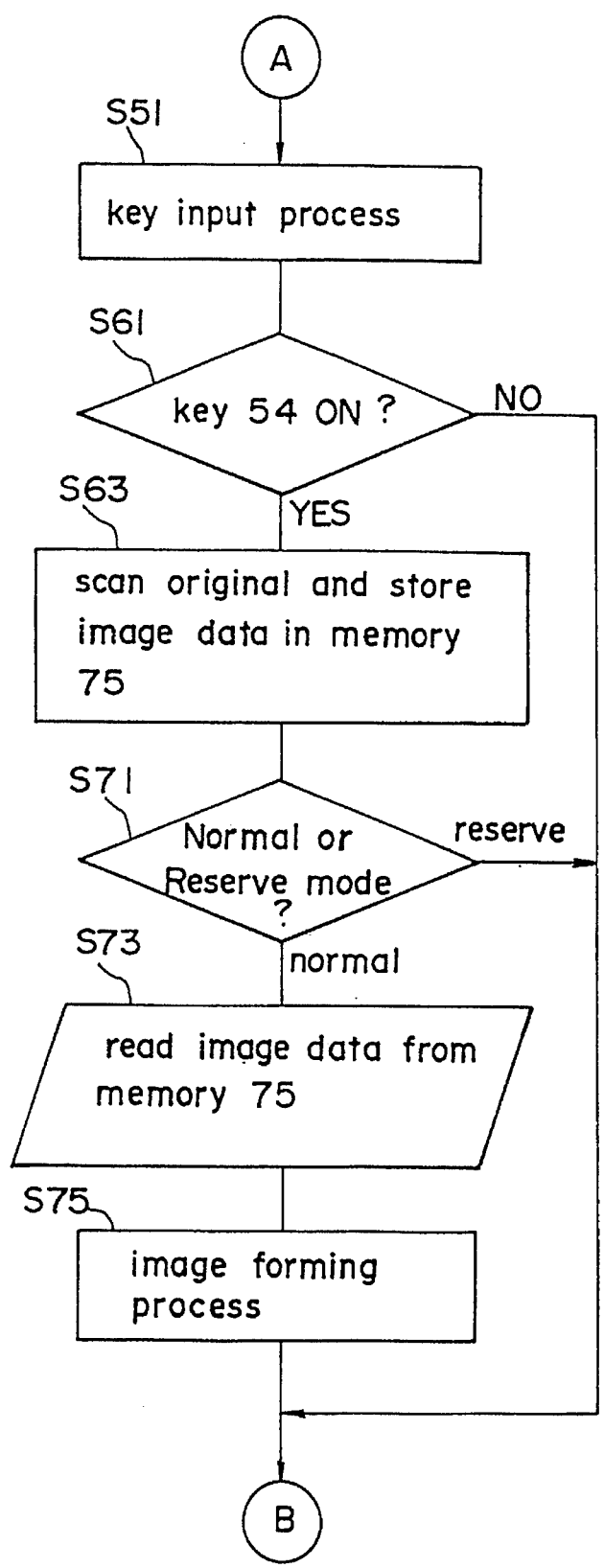
FIG. 9 is a partial flow chart showing the process of the control section 71 of FIG. 4.

FIG. 5 shows the copy mode setting method for the various modes (normal mode, reserve mode) of the copying machine corresponding to the operation of the key switches of the operation panel 50 of FIG. 3. FIG. 4 shows the construction of the control circuit. FIGS. 8 and 9 show the processes of the control section 71.

(2-1) Normal Mode/Reserve Mode Transition and Setting

The transition between the normal mode and reserve mode is executed in accordance with the operation of the reserve set key 51. The setting of the print mode in the normal mode and the reserve mode (parameters when forming an image on paper: number of printed copies, print density, copy paper size and the like) is variously accomplished in accordance with the operation of the key switches corresponding to each print mode. The setting of the color mode (full color mode, monocolor mode, black and white mode, not illustrated) is also integrated. On the other hand, setting the time for reserve copying is input via the time set key 52 and the ten-key pad 55.

(2-1-1) Mode Transition

When the reserve set key 51 is turned on while in the normal copy mode, the reserve mode is set; when the reserve set key 51 is turned on while in the reserve mode, the reserve mode is cancelled, and the normal mode is set. The cancellation of the reserve mode (normal mode set), may be accomplished such that only the reserve mode (in this instance, the modes for setting the various types of print modes are not set) is interrupted for a predetermined time period, insofar as the previously mentioned reserve set key 51 is not turned on again. When the reserve mode is cancelled, the job number is incremented A10. This incrementation is to distinguish a subsequently set reserve mode from a previously set reserve mode.

(2-1-2) Print Mode and Reserve Time Set

Figures 6, 7:
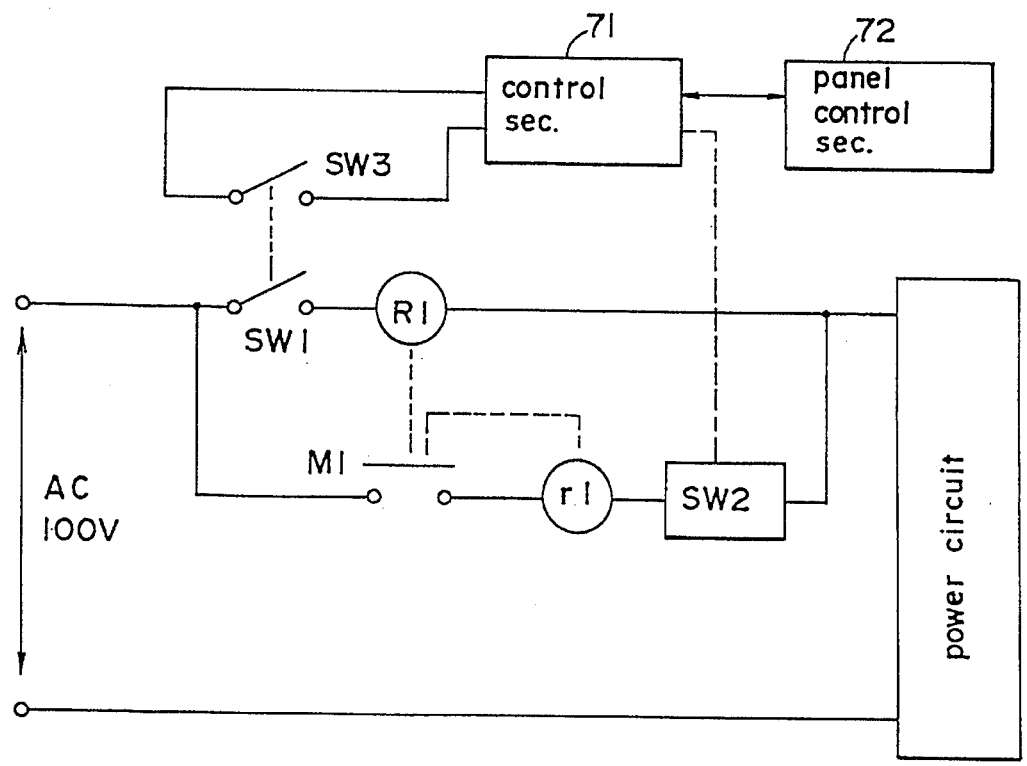
FIG. 6 is an illustration showing the data construction of the reserve control memory 76 of FIG. 4.
FIG. 7 is a circuit diagram of the power unit switch section of the copying machine of FIG. 1.

In the reserve mode, when the time set key 52 is turned on, the time set mode is entered to set the starting time of the reserve mode. As shown in FIG. 3a, the display 53 prompts the operator for reserve time input. Then, when a numerical value is input via the ten-key pad 55 in this mode, said numerical value is defined as cursor position data. For example, when the numerical value A90 is input in the state shown in FIG. 3b(1), said numerical value A90 is defined as the low order column data of the hour data, and the cursor moves to the high order column data of the minute data, as shown in FIG. 3b(2). Thus, when the reserve copy starting time is defined as the low order column data of the minute data, as shown in FIG. 3b(4), the mode for setting the reserve mode starting time is nullified, and the current mode returns to the reserve mode. In this instance, the term "define" means to store in the reserve control memory 76 corresponding with the present job number (refer to FIG. 4), as shown in FIG. 6.

In the reserve mode, when the ten-key pad 55 is turned on (i.e., when the time set key 52 is not on), the numerical value input thereby is defined as data expressing the number of copies (number of printed copies relating to the image data of the same original document). That is, the numerical value is stored in the reserve control memory 76 (refer to FIG. 4) as an attachment to the corresponding job number, as shown in FIG. 6. Then the mode for inputting the number of copies is cancelled by turning on a key other than the ten-key pad 55 and print key 54, and the current mode returns to the reserve mode.

In the reserve mode, the density set key 56 is turned on to enter the mode for setting the reserve copy density. The density set in this mode is similarly stored as an attachment to the corresponding job number. This mode is cancelled by turning on a key other than the density set key 56 and print key 54, and the current mode returns to the reserve mode.

In the reserve mode, paper size data and the like are similarly stored in memory as attachments to the job number, and thereafter the current mode similarly returns to the reserve mode. In the present copying machine, the paper size is selectable from among two sizes at once, other paper sizes may also be selectable by replacing the cassettes 14a and 14b (refer to FIG. 1). Therefore, there is some anxiety of inadvertently removing the cassette accommodating paper of a size used in the current reserve copying in such an instance, the copying machine may be constructed so as to alert the operator to the aforesaid condition.

In the reserve mode, the original document disposed on the document platen 31 is read by turning on the print key 54, and the image data are stored in the previously described image data memory 75. The address of the image data in the image data memory 75 is attached to the corresponding job number, and is stored in the reserve control memory 76 along with the previously mentioned various print modes. The page numbers of the original document of the present job are attached to the job number and stored in the reserve control memory 76 (refer to FIG. 4) in accordance with the original document reading operation, as shown in FIG. 6.

(2-1-3) Normal Print Mode Set

The various print modes (copy modes) are set via operations identical to those of conventional copying machines.

For example, the mode for selecting paper size is entered by turning on the paper selection key 59, and this mode is nullified by operating any key other than the paper selection key 59 and by the elapse of a predetermined time period after the last key operation. Selection is made from among the selectable copy paper sizes (two cassettes are installed in the copying machine allowing selection from among two paper sizes at once).

Turning on the density set key 56 enters the mode for setting the print (copy) density, and this mode is nullified by operating of any key other than the density set key 56 and by the elapse of a predetermined time period after the last key operation.

Print (copy) modes other than those described above are similar.

(2-2) Control Circuit Construction (FIG. 4)

Control of the copying machine of the present invention is accomplished by the control section 71.

The previously mentioned image forming section 10 (printer) and image reading section 30 are each connected to the control section 71 provided in the CPU. The previously described operation panel 50 is also connected to the control section 71 via the panel control section 72. Furthermore, the sorter 90 is also connected to the control section 71 via the sorter control section 73.

The image data read by the image reading section 30 are compressed by the compressor/expander 75 which comprises a hardware circuit, and the compressed data is thereafter stored in the image data memory 75. The image data stored in the image data memory 75 are expanded by the compressor/expander 74 during image formation, and are thereafter transmitted to the image forming section 10. The aforesaid data compression allows the storage of a plurality of pages in memory, for example, a single page A4 size original document normally requires 8 Mbytes for storage before compression, whereas only 0.8 Mbytes are required after compression. In the copying machine of the present invention, a magnetic disk is provided in addition to the semiconductor memory for use as the aforesaid image data memory 75 to increase the storage capacity.

The reserve control memory 76 is connected to the control section 71. Data set as described previously in section (2-1-2) in the reserve mode is attached to each job number and stored in the reserve control memory 76, as shown in FIG. 6. The aforesaid data includes a process complete flag for indicating whether or not the reserve mode print process is completed, a start time indicating the starting time for the reserve print process, control contents indicating the reserve print mode (number of copies, copy density, original document page number to be copied, copy paper size), and the addresses storing the image data for reserve printing. The process complete flag is set at A10 when reserve copying is not being executed, and is set at A10 when reserve copying is being executed.

A clock 77 is connected to the control section 71, and is constructed so as to determine whether or not the reserve copying time has arrived.

(2-3) Control Details

The controls accomplished by the control section 71 are described hereinafter with reference to FIGS. 8 and 9.

Initialization is executed when the power switch SW1 (refer to FIG.7) is turned on (step S11). For example, the number of copies is set at 1, the copy density is set at 1.

In step S21, a determination is made as to whether or not the process to be performed is set for reserve copy. That is, the process complete flag of FIG. 6 determines each job number. If some process complete flag is set at A10 (step S21: YES), the process to be performed is deemed a reserve copy.

Then, in step S23, a determination is made as to whether or not it is time to perform the process pertaining to the job number wherein the process complete flag =1. This determination is made by comparing the current time read from the clock 77 of FIG. 4 with the start time of the relevant job number of FIG. 6. If a result of this determination is such that the current time is start time (step S23: YES), the control contents of the relevant job number of FIG. 6 are read (S25). If the copying machine is currently operating at this time, the end of said operation is awaited, and after completion thereof, step S25 is executed.

Under the condition that the reserve control process (reserve copy operation) has not yet been completed (step S31: NO), the image data is read from the image data memory 75 in accordance with the control contents (step S33), and the image is formed on a paper based on the image data and control contents (step S35). After image formation, the paper is discharged to the bin of the sorter 90 in accordance with the reserve control process (reserve copy operation) execution sequence. At this time, the processing of the first executed reserve control process is such that the paper is discharged to the uppermost bin 91.

When the reserve print operation is completed in accordance with the control contents read in step S25 and the determination in step S31 is AYES, the job number process complete flag is set at A00 (step S37), and the discharge bin number is incremented in preparation for the next reserve control process (step S39). Thus, in the next reserve control process (reserve copy operation), the paper is discharged to the bin one stage lower than the uppermost bin 91. Although the various reserve copies are sorted using a sorter 90 in the copying machine of the present embodiment, said sorting may alternatively be accomplished using a shift tray. For example, when the bin capacity is small, a single reserve copy may be discharged to three bins. In such an instance, when the sorter comprises 10-level bins, at least three reserve copy groups can be recorded. The aforesaid determination of step S31 may further be accomplished in the present embodiment of the invention by determining whether or not the count number of the paper sensor 95 (FIG. 10) is the same as the set number of copies.

Step S51 is the process relating to the key switch input of the various keys of the operation panel 50. This process is executed when the reserve control process (reserve copy operation) is not executed. For example, this process is executed when the determination is ANOU in step S21, or when the determination is ANOU in step S23, or when the reserve control process (reserve copy operation) ends and the discharge bin number has been incremented (step S39).

In step S61 a determination is made as to whether or not the print key 54 is turned on. If the print key 54 is on (step S61: YES), the original document image reading operation is executed (step S63). that is, the original document disposed on the document glass platen 31 is scanned by the scanner 32, and the resultant generated data are compressed by the compressor/expander 74, and thereafter stored in the image data memory 75.

When the image data is read from the image data memory 75, a determination is made as to whether or not the specified mode is the reserve mode or the normal mode (step S71). If the normal mode is specified (step S71: NORMAL), the stored data are transmitted to the image forming section 30, and the print operation is executed (step S75), e.g., a normal copy operation is executed. On the other hand, when the reserve mode is specified (step S71: RESERVE), the routine returns to the step S21. that is, the printing of the image data stored in step S63 is held on standby until the image data reserve time is reached.

(3) Power Switch OFF Countermeasures

As previously described, the copying machine of the present embodiment is capable of setting reserve modes, and the print operation of said reserve modes have as a prerequisite that the power unit is supplying power to the copying machine at the reserve time. Accordingly, countermeasures must be taken in the event that power is inadvertently interrupted. For this reason the power switch of the present copying machine is constructed as shown in FIG. 7.

The power switch SW1 is connected to the power circuit of the copying machine via the relay coil R1. Thus, when the power switch SW1 is turned on, the relay coil R1 is actuated, and the make connect M1 is turned on. The make connect M1 is serially connected to a self-correcting relay coil r1 of the make connect M1 and the semiconductor switch SW2 (normally in the connected state), said elements M1, r1 and SW2 further being serially connected to the aforesaid power switch SW1 and relay coil R1. Therefore, when the power switch SW1 is once turned on, power is continuously supplied to the copying machine even if the power switch SW1 is later interrupted.

The power switch SW1 is also provided with an openable interlock switch SW3 which is linked to the operation of said power switch SW1. The state of the interlock switch SW3 is such that said state is detectable by the control section 71. The control section 71 enter the time input standby state for input from a certain specified key switch (e.g., the ten-key pad 55) when the interlock switch SW3 is OFF. When the aforesaid key input is detected, the semiconductor switch SW2 is broken. Accordingly, in the present copying machine, after the power switch SW1 is turned OFF, the power supply is interrupted only when a specified key switch of the operation panel 50 (e.g., ten-key pad 55) is operated. Therefore, there is no anxiety of cancelling a reserve copy inadvertently. Furthermore, there is no anxiety of damaging the magnetic disk due to inadvertently turning off the power while said magnetic disk is being read. The control section 71 may be constructed to provide an alert when the power switch SW1 is turned OFF in the case that a reserve copy status is reserved.

A backup power source also may be connected to the control section 71, and a semiconductor switch turned on and off via the control section 71 may be connected in parallel to the power switch SW1. In this type of construction, when the time of a reserve copy execution has arrived, a signal turning on the semiconductor switch is output from the control section 71 such that power is supplied to the copying machine. After the reserve copy is executed, if a signal for turning off the semiconductor switch is output from the control section 71, the power supply to the copying machine can be interrupted until the next reserve copy time, thereby preventing wasteful power consumption.

The copying machine of the present invention provides that the time constraints placed on an operator are shortened by allowing the image reading operation and image forming operation at separate times.

The copying machine of the present invention further provides that document feeding trouble does not occur when reading original document images while an operator is present.

Furthermore, the copying machine of the present invention stores original documents beforehand as image data, thereby making possible a plurality of reserves because said original documents are not left stacked in the document tray of an ADF or the like. Moreover, the time period wherein the copying machine is engaged in sole use by a single operator during normal business hours is shortened without the sole use of the document tray.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein

What is claimed is:

1. A copying machine for forming an image of an original document on a sheet, comprising:

image reading means for reading an image of an original document and for generating image data corresponding to the image of said original document, said image reading means being operable under a normal mode and under a reserve mode;

memory means for storing said image data read by said image reading means;

image forming means for forming an image on a sheet based on said data stored in said memory means;

clocking means for clocking time;

judging means for judging whether or not the time being clocked by said clocking means reaches a predetermined time; and controlling means for controlling said image forming means to start the image formation on a sheet based on said image data, which is read by said image reading means under said reserve mode, stored in said memory means when the time clocked by said clocking means reaches the predetermined time.

2. The copying machine as claimed in claim 1, further comprising:

setting means for setting said predetermined time; and second memory means for storing said predetermined time set by said setting means.

3. The copying machine as claimed in claim 2, wherein said predetermined time stored in said second memory means is stored in correlation with said image data stored in said memory means.

4. The copying machine as claimed in claim 1, further comprising:

compressing/expanding means for compressing the image data read by said image reading means when writing it in the memory means and for expanding the image data when reading it out from said memory means.

5. The copying machine as claimed in claim 1, further comprising:

switching means for switching an electrical power which is supplied to said copying machine from a power source between an on state and off state; and supplying means for supplying the electrical power to said copying machine at least during the time when the image formation is to be started by said controlling means irrespective of the state of said switching means.

6. The copying machine as claimed in claim 1, further comprising:

setting means for setting a copy mode which includes the number of copies for one original document; and memory means for storing said copy mode set by said second setting means;

wherein:

said controlling means controlling said image forming means based on said copy mode stored in said second memory means.

7. A copying machine for forming an image of an original document on a sheet, comprising:

image reading means for reading an image of a first and a second original document and for generating image data corresponding to images of said first and second original documents, said image reading means being operable under a normal mode and under a reserve mode;

first memory means for storing said image data read by said image reading means;

image forming means for forming an image on a sheet based on said image data stored in said first memory means;

setting means for setting first and second copy modes respectively for said first and second originals, based on said copy modes the image formation for first and second original documents being executed;

second memory means for storing each copy mode set by said setting means;

clocking means for clocking time;

judging means for judging whether or not the time clocked by said clocking means reaches a predetermined time; and controlling means for controlling said image forming means to start the image formation on the sheet based on said image data, which is read by said image reading means under said reserve mode, stored in said first memory means when the time clocked by said clocking means reaches said predetermined time.

8. The copying machine as claimed in claim 7, further comprising:

second setting means for setting first and second predetermined time respectively for said first and second original documents;

wherein said first and second predetermined times stored in the second memory means respectively in correlation with said first and second original documents.

9. The copying machine as claimed in claim 7, further comprising:

compressing/expanding means for compressing the image data read by said image reading means when writing it in the first memory means and for expanding the image data when reading out it from said first memory means.

10. The copying machine as claimed in claim 7, further comprising:

switching means for switching an electrical power which is supplied to said copying machine from a power source between on an state and off state; and supplying means for supplying the electrical power to said copying machine at least during the time when the image formation is to be started by said controlling means irrespective of the state of said switching means.

11. A copying machine for forming an image on a sheet, comprising:

image reading means for reading an image of an original document to generate corresponding image data, said image reading means being operable under a normal mode and under a reserve mode;

memory means for storing said image data read by said image reading means;

image forming means for forming an image on a sheet based on said image data stored in said memory means;

counting means for counting a predetermined time period; and controlling means for controlling said image forming means to start the image forming operation based on said image data, which is read by said image reading means under said reserve mode, stored in said memory means, when the counting operation of said counting means is terminated.

12. The copying machine as claimed in claim 11, further comprising setting means for setting said predetermined time period.

13. The copying machine as claimed in claim 11, wherein said counting means starts cou counting operation when the image data read by said image reading means is stored in said memory means.

14. The copying machine as claimed in claim 11, further comprising second setting means for setting a copy mode which includes a number of copies for one original document and is stored in said memory means together with the image data.

15. A copying machine for forming an image of an original document on a sheet, comprising:

image reading means for reading an image of an original document to generate image data;

memory means for storing said image data generated by said image reading means;

image forming means for forming an image on a sheet based on said image data stored in said memory means;

clocking means for clocking time;

setting means for setting a reserve mode for starting an image forming operation when the current time clocked by said clocking means reaches a predetermined time and for setting a normal mode, said image reading means being operable under said reserve mode and under said normal mode; and inhibiting means for inhibiting said image forming means from starting the image forming operation based on said image data, which is read by said image reading means under said reserve mode, stored in said memory means, until the current time reaches said predetermined time.

16. A copying machine for copying an image of an original document, comprising:

an image reader by which the image of an original document is read and converted into image data, said image reader being operable under a normal mode and under a reserve mode;

a memory in which said image data is stored;

an image forming device by which an image is formed on a sheet based on said image data stored in said memory;

a clock;

a setting device by which a desired time is set; and a control circuit which initiates an operation of said image forming device based on said image data, which is read by said image reader under said reserve mode, stored in said memory, in accordance with a result of a comparison between the current time read from the clock and said desired time.

17. A copying machine as claimed in claim 16, wherein said image forming device includes an electrosensitive drum upon which electrostatic latent image are formed thereon.

18. A copying machine as claimed in claim 16, wherein said setting device includes an operation panel which has key switches for setting the time.

19. A copying machine as claimed in claim 16, further comprising:

a sheet feeder which feeds said sheet upon which images are formed thereon by the image forming device.

20. A copying machine as claimed in claim 19, wherein said sheet feeder includes a plurality of sheet cassettes.

21. A copying machine as claimed in claim 20, wherein said sheet cassettes permit a selection from a plurality of sheet sizes at the same time.

22. A copying machine as claimed in claim 20, wherein said copying machine is a color copying machine, and said image reader is a color image reader which has a color image sensor, and said image forming device is a color image forming device which forms a color image on said sheet based on said image data stored in said memory.

23. A copying machine as claimed in claim 22, further comprising:

a transfer device including a transfer drum upon which paper is disposed thereon and a transfer color image is applied, to the sheet.

24. A copying machine as claimed in claim 16, further comprising:

a sorter which sorts the sheets.

25. A copying machine as claimed in claim 21, wherein said sorter has a plurality of bins which discharge the sheets.

26. A copying machine as claimed in claim 22, wherein said control circuit controls the sorter so that a sheet discharges into a predetermined bin in accordance with a selected mode of operation.

27. A copying machine for forming an image of an original document on a sheet comprising:

a power switch for providing power from a power source to enable a copying operation;

means for receiving an original document and generating document data representative of the original document;

means for storing the document data;

means for forming images of the document data on copy sheets;

a control panel for permitting the user to set a copying mode of operation for forming images on copy sheets, a reserve mode of operation wherein a copying mode of document data currently stored and having images of the document data being reproduced on copy sheets is interrupted and a subsequent document can be processed by the means for receiving to generate a reserve document data representative of the subsequent document which is also stored in the means for storing and a resumption mode of operation to return the copying machine from the reserve mode of operation to a resumption of the current copying mode of operation;

a clocking means to set a predetermined time period for reproduction of the stored reserve document data;

a judging means for judging when the clocking means time period reaches the predetermined time period;

controlling means for starting a reserve mode of copying operation of the reserved document data when the judging means indicates the predetermined time period has been reached; and power continuation means for continuing power to the copying machine until the reserve document data has been processed onto copy sheets even if the power switch has been turned off.

\* \* \* \* \*